United States Patent [19]
Tsuboi

[11] Patent Number: 5,978,508
[45] Date of Patent: Nov. 2, 1999

[54] TWO-DIMENSIONAL INVERSE DISCRETE COSINE TRANSFORMATION CIRCUIT FOR MPEG2 VIDEO DECODER

[75] Inventor: Eiji Tsuboi, Tokyo, Japan

[73] Assignee: NEC Corporation, Tokyo, Japan

[21] Appl. No.: 08/933,079

[22] Filed: Sep. 18, 1997

[30] Foreign Application Priority Data

Sep. 20, 1996 [JP] Japan .................................. 8-271631

[51] Int. Cl.[6] ........................................... G06K 9/36
[52] U.S. Cl. .......................... 382/234; 382/250; 382/277; 348/403; 348/420; 358/432
[58] Field of Search ................................. 348/403, 420; 358/432, 433; 382/233, 234, 250, 277

[56] References Cited

U.S. PATENT DOCUMENTS

| 5,054,103 | 10/1991 | Yasuda et al. | 382/250 |
| 5,339,315 | 8/1994 | Maeda et al. | 348/7 |
| 5,594,679 | 1/1997 | Iwata | 364/736.05 |

FOREIGN PATENT DOCUMENTS

| 1-201773 | 8/1989 | Japan . |
| 4-277932 | 10/1992 | Japan . |
| 7-234863 | 9/1995 | Japan . |
| 8-110903 | 4/1996 | Japan . |
| 8-235159 | 9/1996 | Japan . |

Primary Examiner—Leo H. Boudreau
Assistant Examiner—Gregory Desire
Attorney, Agent, or Firm—Sughrue, Mion, Zinn, Macpeak & Seas, PLLC

[57] ABSTRACT

A two-dimensional inverse discrete cosine transformation circuit of an MPEG2 video decoder including a one-dimensional inverse discrete cosine transformation circuit, an input switching circuit for receiving input of new data and data already subjected to first one-dimensional inverse discrete cosine transformation and sending one of them to the one-dimensional inverse discrete cosine transformation circuit, an input switching control circuit for controlling the input switching circuit so as to alternately and continuously output data output from a first serial-parallel conversion circuit and data output from a second serial-parallel conversion circuit, and a data allocation circuit for switching and controlling an output destination of output data of the one-dimensional inverse discrete cosine transformation circuit based on the timing of switching by the input switching control circuit.

18 Claims, 9 Drawing Sheets

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

TWO-DIMENSIONAL INVERSE DISCRETE COSINE TRANSFORMATION CIRCUIT FOR MPEG2 VIDEO DECODER

BACKGROUNDS OF THE INVENTION

1. Field of the Invention

The present invention relates to a two-dimensional inverse discrete cosine transformation circuit for use in an MPEG2 (Moving Picture Export Group Phase 2) video decoder.

2. Description of the Related Art

Conventional two-dimensional inverse discrete cosine transformation circuits for use in an MPEG video decoder execute two-dimensional inverse discrete cosine transformation by conducting first one-dimensional inverse discrete cosine transformation with respect to 64 data as a unit (block) and subsequently conducting second one-dimensional inverse discrete cosine transformation with the data of the same block. One of conventional two-dimensional inverse discrete cosine transformation circuits of this kind is disclosed, for example, in the literature "A Single-Chip MPEG1 Audio/Video Decoder" (Y. Katayama, et. al). Structure of the conventional two-dimensional inverse discrete cosine transformation circuit disclosed in the literature is shown in FIG. 9.

As shown in the figure, the conventional two-dimensional inverse discrete cosine transformation circuit includes serial-parallel conversion circuits 11 and 16 for conducting 1:8 serial-parallel conversion with respect to input data and outputting converted data, an input switching circuit 12 for receiving input of the outputs of the serial-parallel conversion circuits 11 and 16 and selectively outputting either of them, a one-dimensional inverse discrete cosine transformation circuit 13 for receiving input of the output of the input switching circuit 12 to conduct one-dimensional inverse discrete cosine transformation, a serial-parallel conversion circuit 14 for receiving input of the output of the one-dimensional inverse discrete cosine transformation circuit 13 to conduct 2:1 serial-parallel conversion, and a memory 15 for receiving input of the output of the serial-parallel conversion circuit 14 and temporarily storing and then outputting the same to the serial-parallel conversion circuit 16.

One-dimensional inverse discrete cosine transformation here is transformation expressed by the following equation (1).

$$f(x) = \tau c(u) F(u) \cos\{(2x+1)u\pi/16\}/2 \quad (1)$$

In the above expression, x and u represent an integer value of 0 to 7, and C(u) attains $1/\sqrt{2}$ when u=0 and attains 1 when u=1, ..., 7. $\Sigma$ represents a sum of u=0, ..., 7, while $\pi$ represents a circle ratio. According to this expression, eight data after transformation will be calculated from eight data.

In thus structured conventional two-dimensional inverse discrete cosine transformation circuit, when one data is input at each clock to the serial-parallel conversion circuit 11 through an input pin, the circuit 11 conducts 1:8 serial-parallel conversion with respect to accumulated eight data eight clocks after. Then, the output of the serial-parallel conversion circuit 11 is applied to the one-dimensional inverse discrete cosine transformation circuit 13 via the input switching circuit 12, whereby the one-dimensional inverse discrete cosine transformation circuit 13 conducts the above-described one-dimensional inverse discrete cosine transformation with respect to the applied eight data as one group. The output data of the one-dimensional inverse discrete cosine transformation circuit 13 is serial-parallel-converted by the serial-parallel conversion circuit 14 and stored in memory 15. The memory 15 sequentially stores data row by row at 64 addresses of eight rows by eight columns, for example.

When data of one block, that is, 64 data is written at the memory 15, the input switching circuit 12 switches input to the one-dimensional inverse discrete cosine transformation circuit 13 from the serial-parallel conversion circuit 11 to the serial-parallel conversion circuit 16. As a result, the data written at the memory 15 is recursively input to the one-dimensional inverse discrete cosine transformation circuit 13 through the serial-parallel conversion circuit 16.

The serial-parallel conversion circuit 16 sequentially reads data on the basis of a column of the addresses of the memory 15 to conduct 1:8 serial-parallel conversion. The data again subjected to serial-parallel conversion is applied to the one-dimensional inverse discrete cosine transformation circuit 13 via the input switching circuit 12, so that the one-dimensional inverse discrete cosine transformation circuit 13 conducts one-dimensional inverse discrete cosine transformation in the same manner as in the first transformation. The output data thus subjected to the one-dimensional inverse discrete cosine transformation twice is output through the serial-parallel conversion circuit 14 as output data of the two-dimensional inverse discrete cosine transformation circuit.

By thus repeating one-dimensional inverse discrete cosine transformation twice, two-dimensional inverse discrete cosine transformation is conducted. Two-dimensional inverse discrete cosine transformation here is transformation expressed by the following equation (2).

$$f(x,y) = \Sigma\Sigma' c(u)c(v)F(u)F(v)\cos\{(2x+1)u\pi/16\}\cos\{(2y+1)v\pi/16\} \quad (2)$$

In the above expression, x, y, u and v represent an integer value of 0 to 7, and C(u) and C(v) attain $1/\sqrt{2}$ when u=0 and v=0 and attain 1 when u=1, ..., 7 or v=1 ..., 7. $\Sigma$ represents a sum of u=0, ..., 7 and Z' represents a sum of v=0, ..., 7, while $\pi$ represents a circle ratio.

Operation of the conventional two-dimensional inverse discrete cosine transformation circuit will be described with reference to time charts of FIGS. 10 and 11.

In FIG. 10, when data input starts at T0, every time input of eight data is completed, the data is applied to the one-dimensional inverse discrete cosine transformation circuit 13 (FIG. 10, L0, L1, ...). At this time, since the one-dimensional inverse discrete cosine transformation circuit 13 is capable of processing two data at one clock, input to the one-dimensional inverse discrete cosine transformation circuit 13 only needs to be conducted at four clocks. At the remaining four clocks before eight subsequent input data is accumulated, the one-dimensional inverse discrete cosine transformation circuit 13 is at an input waiting state (FIG. 10, 100). Every time data is applied to the one-dimensional inverse discrete cosine transformation circuit 13 at timing L0, L1, ..., data (FIG. 10, L'0, L'1, ...) is calculated whose first one-dimensional inverse discrete cosine transformation is completed after a period of an internal processing time (FIG. 10, 200) of the one-dimensional inverse discrete cosine transformation circuit 13.

At the completion of the foregoing processing conducted with respect to 64 input data (FIG. 11, T1), data to be applied to the one-dimensional inverse discrete cosine transformation circuit 13 is switched from the data as the output of the serial-parallel conversion circuit 11 to that as the output of the serial-parallel conversion circuit 16 (FIG. 11, 300) to apply eight data each read from the memory 15 to the one-dimensional inverse discrete cosine transformation circuit 13 (FIG. 11, M0) and calculate data subjected to second one-dimensional inverse discrete cosine transformation. At this time, no data input through the 20 input pin is possible during the execution of the second one-dimensional inverse discrete cosine transformation (FIG. 11, 400). Assuming a time from T0 of FIG. 10 to T1 of FIG. 11 to be represented as T, time required for processing data of one block, that is, 64 data, will be therefore represented as 2T.

In other words, the conventional inverse discrete cosine transformation circuits need to conduct first one-dimensional inverse discrete cosine transformation with respect to all the 64 data and then conduct second one-dimensional inverse discrete cosine transformation after switching input. During the execution of the second one-dimensional inverse discrete cosine transformation, no new data input is acceptable. As a result, much time is required for the processing of data of one block, that is, 64 data.

To reduce a time required for the above-described two-dimensional inverse discrete cosine transformation processing, proposed is a method of eliminating an input waiting state of a one-dimensional inverse discrete cosine transformation circuit to reduce data processing time for one block by half by inputting two data each at one clock. However, since in an MPEG video decoder, an inverse quantization circuit for conducting inverse quantization processing, which is pre-processing of two-dimensional inverse discrete cosine transformation processing, is structured to process one data at one clock because of conditions of circuit scale, this method is not desirable in view of a circuit scale of the entire MPEG2 video decoder.

SUMMARY OF THE INVENTION

An object of the present invention is to provide a two-dimensional inverse discrete cosine transformation circuit of an MPEG2 video decoder which enables reduction of two-dimensional inverse discrete cosine transformation processing time without changing circuit scale.

According to one aspect of the invention, a two-dimensional inverse discrete cosine transformation circuit of an MPEG2 video decoder which conducts two-dimensional inverse discrete cosine transformation by subjecting block data composed of a plurality of data to one-dimensional inverse discrete cosine transformation twice, comprises first serial-parallel converter for parallel-converting externally applied new input data and outputting the converted data, storage for storing data of a previous block already subjected to first one-dimensional inverse discrete cosine transformation, second serial-parallel converter for obtaining the data of a previous block from the storage, parallel-converting the data and outputting the converted data, input switch for receiving input of data output from the first serial-parallel converter and data output from the second serial-parallel converter and selectively switching and outputting one of them, input switching control for controlling operation of the input switch, one-dimensional inverse discrete cosine transformer means for conducting one-dimensional inverse discrete cosine transformation with respect to data applied through the input switch, third serial-parallel converter for serial-converting and outputting output data of the one-dimensional inverse discrete cosine transformer, and data allocator or controlling an output destination of output data of the third serial-parallel converter by switching under the control of the input switch and the input switching control to send data subjected to first one-dimensional inverse discrete cosine transformation to the storage and to externally output data subjected to second one-dimensional inverse discrete cosine transformation, the input switching control controlling the input switch to alternately and continuously output the data output from the first serial-parallel converter and the data output from the second serial-parallel converter at every predetermined time of operation clocks, and the data allocator switching an output destination of the output data of the third serial-parallel converter at timing delayed by an internal processing time of the one-dimensional inverse discrete cosine transformer from the timing of switching of the input switch by the input switching control.

The input switching control may transmit an input switching signal instructing on the switching of the input switch at every predetermined time of operation clocks, the input switch may switch output data on condition of the reception of the input switching signal, and the data allocator may switch an output destination of the output data of the third serial-parallel converter means according to the setting taking a delay by an internal processing time of the one-dimensional inverse discrete cosine transformer into consideration on condition of the reception of the input switching signal.

The input switching control may transmit an input switching signal instructing on the switching of the input switch at every one operation clock, the input switch may switch output data at every one operation clock on condition of the reception of the input switching signal, and the data allocator may switch an output destination of the output data of the third serial-parallel converter at every one operation clock according to the setting taking a delay by an internal processing time of the one-dimensional inverse discrete cosine transformer into consideration on condition of the reception of the input switching signal.

In the preferred construction, the storage has an address space forming a square matrix, when data of one block applied from the data allocator is stored along a row of the address space in order, reads the data along a column of the address space and sequentially stores data of a subsequent block applied next from the data allocator along the column of the address space from which the data has been read, and when data of one block applied from the data allocator is stored along a column of the address space in order, reads the data along a row of the address space and sequentially stores data of a subsequent block applied next from the data allocator along the row of the address space from which the data has been read.

In the preferred construction, the input switching control transmits an input switching signal instructing on the switching of the input switch at every predetermined time of operation clocks, the input switch switches output data on condition of the reception of the input switching signal, the data allocator switches an output destination of the output data of the third serial-parallel converter according to the setting taking a delay by an internal processing time of the one-dimensional inverse discrete cosine transformer means into consideration on condition of the reception of the input switching signal, and the storage has an address space forming a square matrix, when data of one block applied from the data allocation means is stored along a row of the address space in order, reads the data along a column of the address space and sequentially stores data of a subsequent block applied next from the data allocation means along the column of the address space from which the data has been read, and when data of one block applied from the data allocator is stored along a column of the address space in order, reads the data along a row of the address space and sequentially stores data of a subsequent block applied next from the data allocator along the row of the address space from which the data has been read.

In the preferred construction, the input switching control transmits an input switching signal instructing on the switching of the input switch switch at every one operation clock, the input switch switches output data at every one operation clock on condition of the reception of the input switching signal, the data allocator switches an output destination of the output data of the third serial-parallel conversor at every one operation clock according to the setting taking a delay by an internal processing time of the one-dimensional inverse discrete cosine transformer into consideration on condition of the reception of the input switching signal, and the storage has an address space forming a square matrix, when data of one block applied from the data allocator is stored along a row of the address space in order, reads the data along a column of the address space and sequentially stores data of a subsequent block applied next from the data allocator along the column of the address space from which the data has been read, and when data of one block applied from the data allocator is stored along a column of the address space in order, reads the data along a row of the address space and sequentially stores data of a subsequent block applied next from the data allocator along the row of the address space from which the data has been read.

In another preferred construction, the storage has an address space forming a square matrix of eight rows by eight columns, when data of one block applied from the data allocator is stored along a row of the address space in order, reads the data along a column of the address space and sequentially stores data of a subsequent block applied next from the data allocator along the column of the address space from which the data has been read, and when data of one block applied from the data allocator is stored along a column of the address space in order, reads the data along a row of the address space and sequentially stores data of a subsequent block applied next from the data allocator along the row of the address space from which the data has been read.

In another preferred construction, the input switching control transmits an input switching signal instructing on the switching of the input switch switch at every predetermined time of operation clocks, the input switch switches output data on condition of the reception of the input switching signal, the data allocator switches an output destination of the output data of the third serial-parallel converter according to the setting taking a delay by an internal processing time of the one-dimensional inverse discrete cosine transformer into consideration on condition of the reception of the input switching signal, and the storage has an address space forming a square matrix of eight rows by eight columns, when 20 data of one block applied from the data allocator is stored along a row of the address space in order, reads the data along a column of the address space and sequentially stores data of a subsequent block applied next from the data allocator along the column of the address space from which the data has been read, and when data of one block applied from the data allocator is stored along a column of the address space in order, reads the data along a row of the address space and sequentially stores data of a subsequent block applied next from the data allocator along the row of the address space from which the data has been read.

In another preferred construction, the input switching control transmits an input switching signal instructing on the switching of the input switch at every one operation clock, the input switch switches output data at every one operation clock on condition of the reception of the input switching signal, the data allocator switches an output destination of the output data of the third serial-parallel converter at every one operation clock according to the setting taking a delay by an internal processing time of the one-dimensional inverse discrete cosine transformer into consideration on condition of the reception of the input switching signal, and the storage has an address space forming a square matrix of eight rows by eight columns, when data of one block applied from the data allocation means is stored along a row of the address space in order, reads the data along a column of the address space and sequentially stores data of a subsequent block applied next from the data allocator along the column of the address space from which the data has been read, and when data of one block applied from the data allocator is stored along a column of the address space in order, reads the data along a row of the address space and sequentially stores data of a subsequent block applied next from the data allocator along the row of the address space from which the data has been read.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known res are not shown in detail in order to unnecessarily obscure the present invention.

Figure 1:
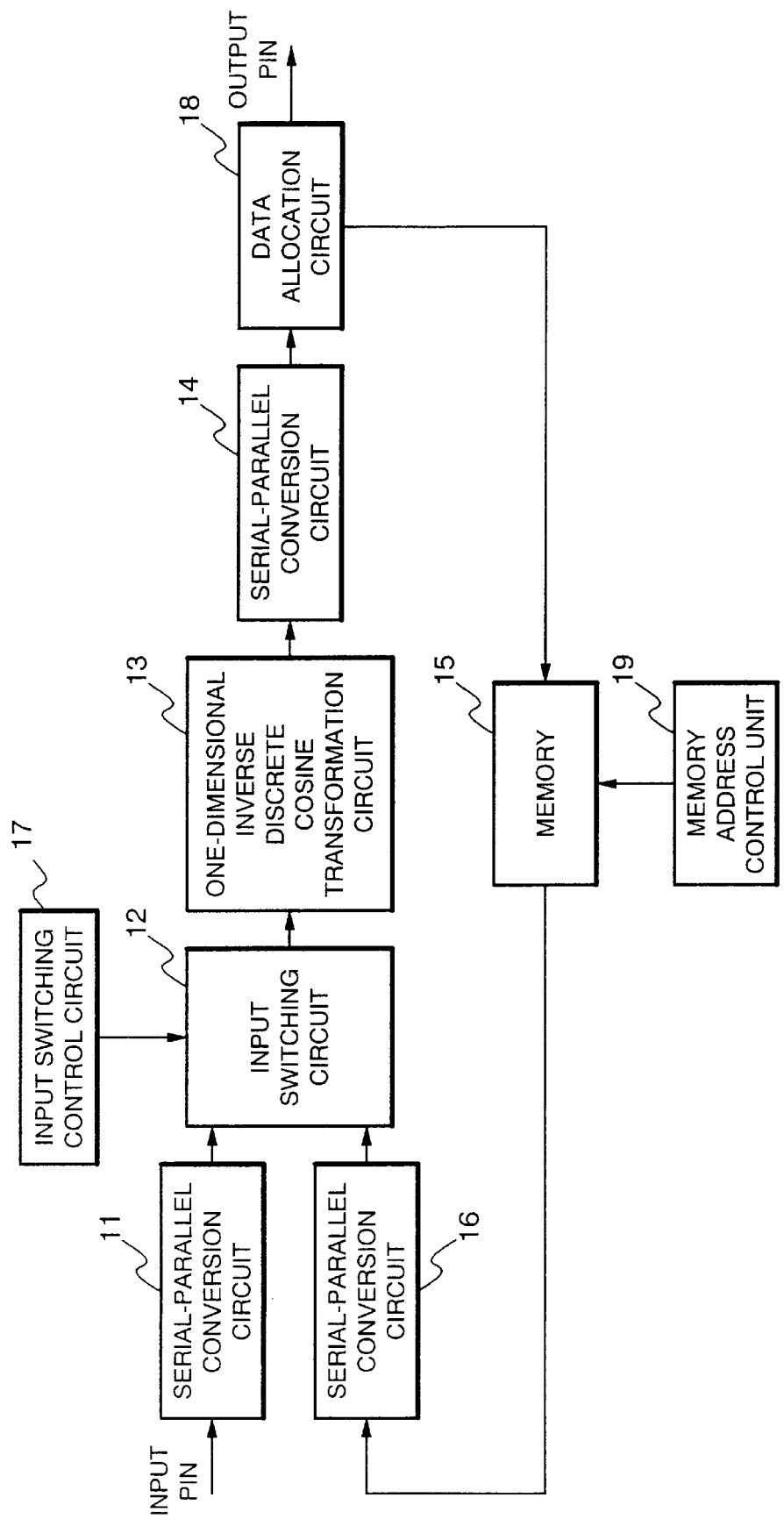
FIG. 1 is a block diagram showing structure of a two-dimensional inverse discrete cosine transformation circuit according to one embodiment of the present invention.

FIG. 1 is a block diagram showing structure of a two-dimensional inverse discrete cosine transformation circuit according to one embodiment of the present invention.

As shown in the figure, the two-dimensional inverse discrete cosine transformation circuit of the present embodiment includes serial-parallel conversion circuits 11 and 16 for conducting 1:8 serial-parallel conversion with respect to input data and outputting converted data, an input switching circuit 12 for receiving input of outputs of the serial-parallel conversion circuits 11 and 16 and selectively outputting either of the outputs, a one-dimensional inverse discrete cosine transformation circuit 13 for receiving input of the output of the input switching circuit 12 to conduct one-dimensional inverse discrete cosine transformation, a serial-parallel conversion circuit 14 for receiving input of the output of the one-dimensional inverse discrete cosine transformation circuit 13 to conduct 2:1 serial-parallel conversion, a memory 15 for receiving input of the output of the serial-parallel conversion circuit 14 and temporarily storing and then outputting the same to the serial-parallel conversion circuit 16, an input switching control circuit 17 for controlling operation of the input switching circuit 12 according to an operation clock, a data allocation circuit 18 for controlling an output destination of the output of the serial-parallel conversion circuit 14 according to the operation of the input switching control circuit 17, and a memory address control unit 19 for managing addresses of the memory 15. In FIG. 1, illustration is made only of a characteristic part of the structure of the present embodiment and that of the remaining common part is omitted.

In the above structure, the first serial-parallel conversion circuit 11 conducts 1:8 parallel conversion with respect to input data applied through an input pin and sends eight each of converted data to the input switching circuit 12. The second serial-parallel conversion circuit 16 reads data from the memory 15 and conducts 1:8 parallel conversion with respect to the read data to send eight each of converted data to the input switching circuit 12.

The input switching circuit 12 selects either of eight data from the first serial-parallel conversion circuit 11 or eight data from the second serial-parallel conversion circuit 16 in response to an input switching signal from the input switching control circuit 17 and inputs the selected data to the one-dimensional inverse discrete cosine transformation circuit 13. It is assumed for example that when the input switching signal is at a state of "0", the circuit 12 selects eight data from the first serial-parallel conversion circuit 11 and when the signal is at a state of "1", the circuit selects eight data from the second serial-parallel conversion circuit 16.

The one-dimensional inverse discrete cosine transformation circuit 13 conducts the one-dimensional inverse discrete cosine transformation expressed by the above equation (1) with respect to output data from the serial-parallel conversion circuit 11 or 16 applied through the input switching circuit 12. An example of structure of the one-dimensional inverse discrete cosine transformation circuit 13 is shown in FIG. 2.

Figure 2:
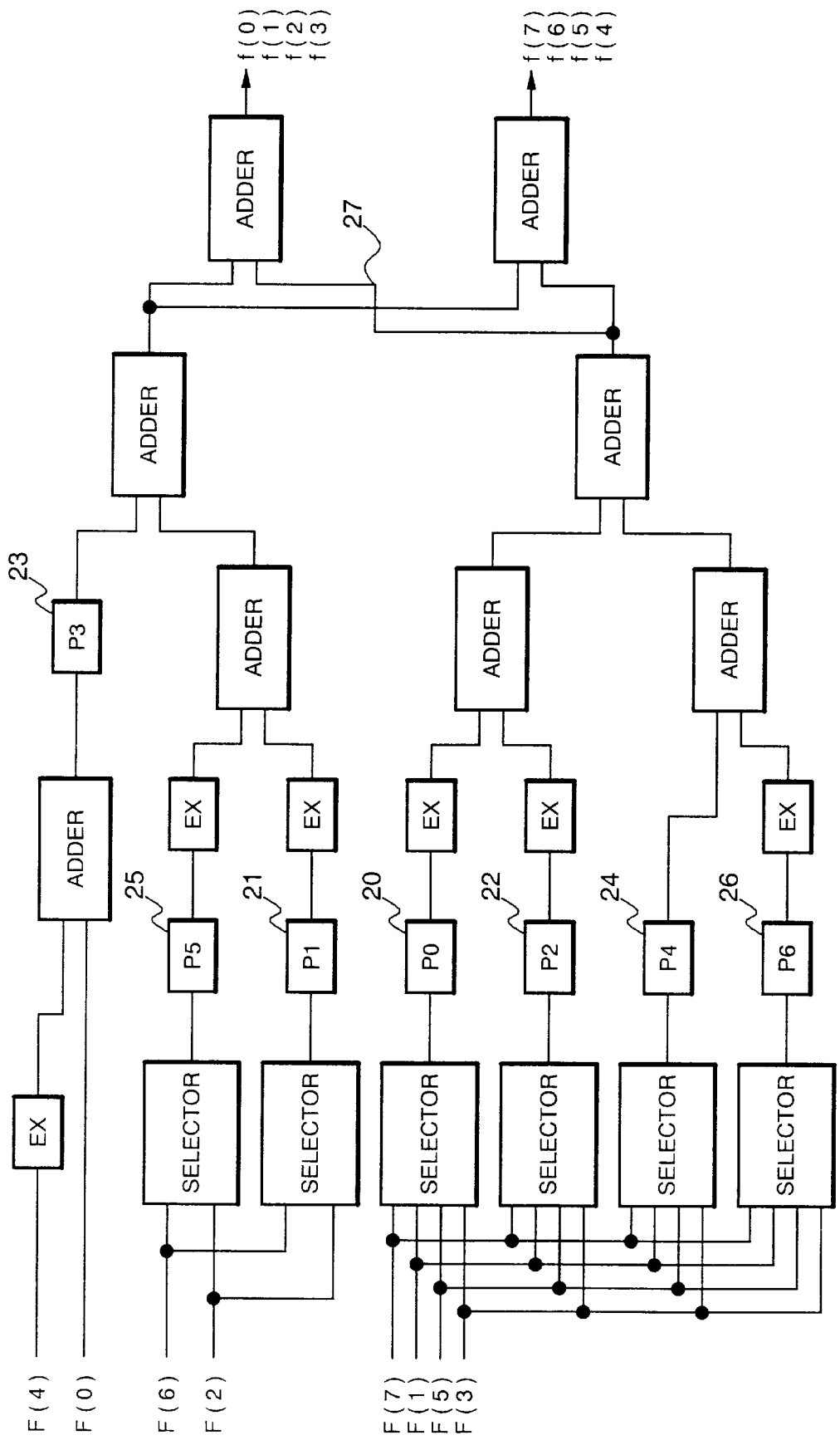
FIG. 2 is a block diagram showing structure of a one-dimensional inverse discrete cosine transformation circuit of the present embodiment.

In FIG. 2, P0, P1, P2, P3, P4, P5 and P6 represent multipliers with cos 7π/16, cos 3π/8, cos 5π/16, cos π/4, cos 3π/16, cos π/8 and cos π/16 as coefficients, respectively. EX represents a circuit which determines a sign + or − for an output value of the multiplier according to the operation expression. Data F(0), F(1), . . . , F(7) applied to the one-dimensional inverse discrete cosine transformation circuit 13 is converted into f(0), f(1), . . . , f(7), respectively, which is output in four clocks according to butterfly operation, that is, two each data is output at one clock, like "f(0), f(7)", "f(1), f(6)", "f(2), f(5)" and "f(3), f(4)".

The third serial-parallel conversion circuit 14 conducts 2:1 serial-parallel conversion with respect to output data of the one-dimensional inverse discrete cosine transformation circuit 13. More specifically, the circuit 14 converts two each parallel data which is output at one clock into serial data and outputs the converted data.

The data allocation circuit 18 controls an output destination of output data of the serial-parallel conversion circuit 14 by switching based on the input switching signal output from the input switching control circuit 17. More specifically, output data which has been read from the memory 15, applied to the one-dimensional inverse discrete cosine transformation circuit 13 through the second serial-parallel conventional circuit 16 and subjected to one-dimensional inverse discrete cosine transformation is output to the output pin. Output data which has been applied through the input pin, applied to the one-dimensional inverse discrete cosine transformation circuit 13 through the first serial-parallel conversion circuit 11 and subjected to one-dimensional inverse discrete cosine transformation is output to the memory 15. Output destination switching timing is set based on an internal processing time of the one-dimensional inverse discrete cosine transformation circuit 13 and is determined based on the input switching signal of the input switching control circuit 17.

The memory 15 generates an address in response to a memory address switching signal from the memory address control unit 19 to conduct read and write of data. An example of structure of the memory 15 is shown in FIG. 3.

Figures 3, 6:
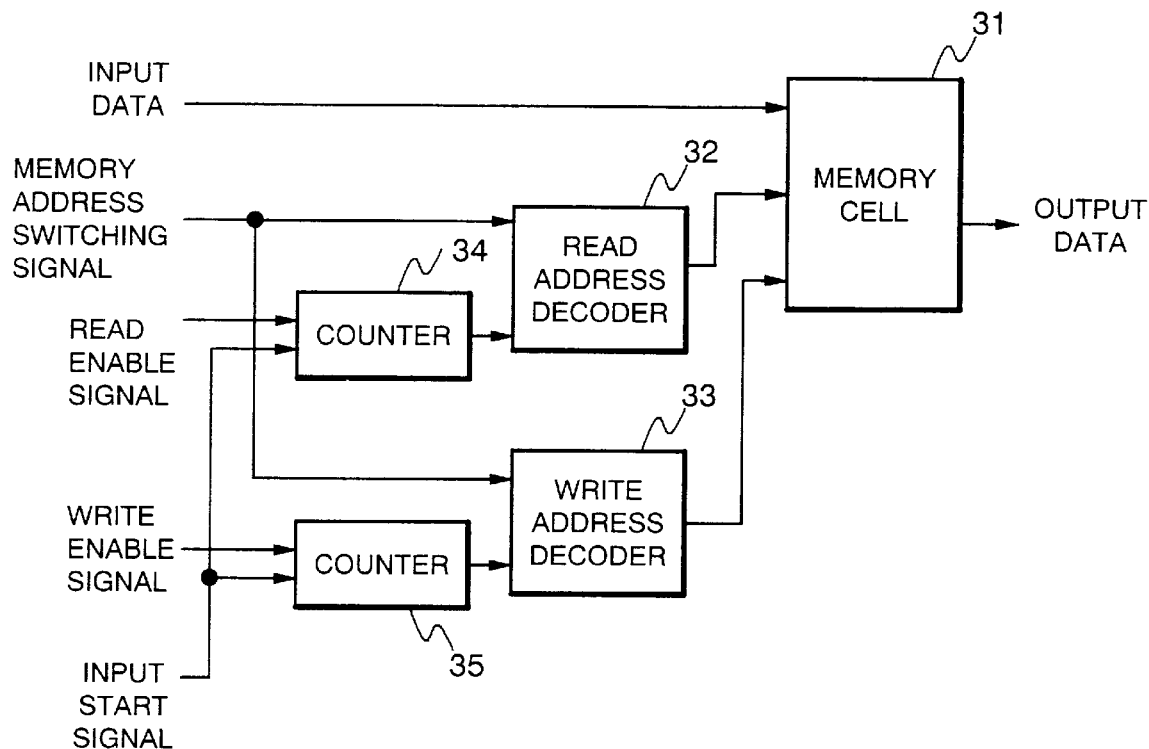
FIG. 3 is a block diagram showing structure of a memory of the present embodiment.
FIG. 6 is a diagram showing addresses of the memory.

In FIG. 3, a memory cell 31 is a dual port RAM. A counter 34 is a 6-bit counter which is incremented when a read enable signal is at the state of 1. A counter 35 is a 6-bit counter which is incremented when a write enable signal is at the state of 1. The counters 34 and 35 are both reset by an input start signal. A read address decoder 32 decodes the value of the counter 34 in response to the memory address switching signal from the memory address control unit 19 and generates a read address to read data. A write address decoder 33 decodes the value of the counter 35 in response to the memory address switching signal from the memory address control unit 19 and generates a write address to write data. With the addresses of the memory 15 set as shown in FIG. 6, when the memory address switching signal is at the state of 0, the counter value itself of both of the counters 34 and 35 is taken as an address to conduct read and write in a row direction. On the other hand, when the memory address switching signal is at the state of 1, the order of 0, 1, 2, 3, . . . , 63 to which a row direction is given priority is decoded in the order of 0, 8, 16, 24, 32, 40, 48, 56, . . . 63 to which a column direction is given priority, thereby conducting read and write in a column direction.

In the structure of above-described memory 15, the value of the counter 34 will be larger than that of the counter 35 at any time. Therefore, in the memory cell 31, no new data will be overwritten at an address from which data is yet to be read.

The input switching control circuit 17, which is composed only of a binary counter, has an input switching signal as its output signal reset to the state of "0" when input from the input pin starts and incremented at every clock. As a result, by the operation of the input switching circuit 12 in response to the input switching signal, input data applied from the input pin through the serial-parallel conversion circuit 11 and read data read from the memory 15 through the serial-parallel conversion circuit 16 is alternately applied to the one-dimensional inverse discrete cosine transformation circuit 13 at every one clock.

The memory address control unit 19, which is composed only of a binary counter, has a memory address switching signal as its output signal set to the state of "1" as an initial value and incremented when input from the input pin starts.

Next, operation of the present embodiment will be described with reference to the time charts of FIGS. 4 and 5.

In the present operation example, it is assumed that a memory address switching signal output from the memory address control unit 19 is at the state of "1" before T0. In addition, an internal processing time of the one-dimensional inverse discrete cosine transformation circuit 13 is assumed to be five clocks. The data allocation circuit 18 is assumed to send data to the memory 15 when the input switching signal output from the input switching control circuit 17 is at the state of "1" and to output data to the output pin when the signal is at the state of "0". Stored in the memory 15 is one block of 64 data which has been subjected to first one-dimensional inverse discrete cosine transformation. This data is referred to as data of a previous block subjected to one-dimensional inverse discrete cosine transformation.

When data input starts from the input pin to the serial-parallel conversion circuit 11 at T0, the input switching signal of the input switching control circuit 17 is reset to the state of "0", so that the state of the memory address switching signal of the memory address control unit 19 changes from the state of "1" to "0". Hereafter, the state of the input switching signal is switched between the state of "1" and "0" at every one clock.

Starting at one clock after T0, the serial-parallel conversion circuit 16 reads data of a previous block subjected to one-dimensional inverse discrete cosine transformation which is stored in the memory 15 one by one at every one clock. At this time, since the memory address switching signal is at the state of "0", data is read in a row direction of the addresses of the memory 15.

Figure 4:
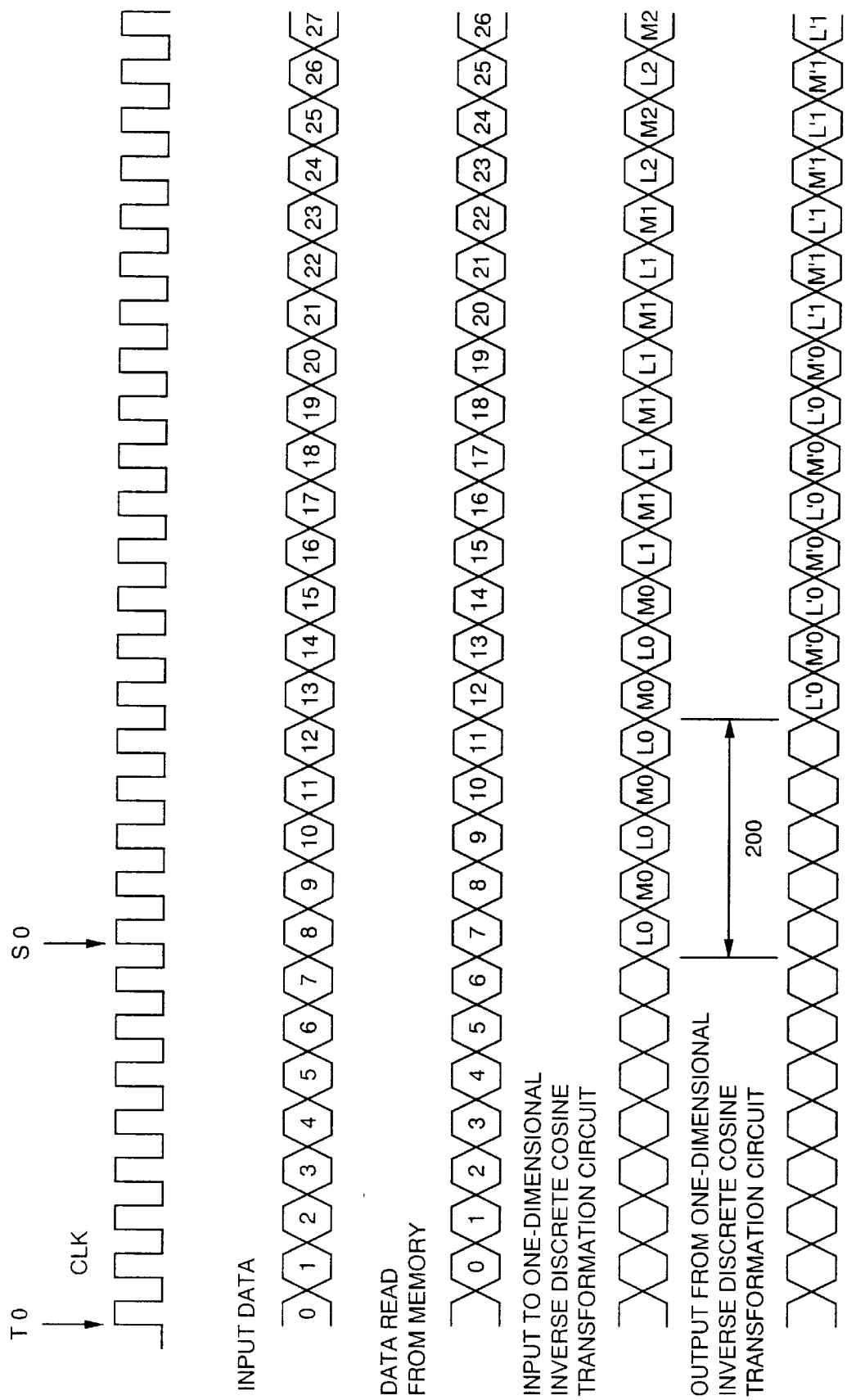
FIG. 4 is a timing chart showing operation of the present embodiment.

When eight input data is applied to the serial-parallel conversion circuit 11 at S0, if the input switching signal of the input switching control circuit 17 is at the state of "0", the input data is output from the serial-parallel conversion circuit 11 to the one-dimensional inverse discrete cosine transformation circuit 13 (FIG. 4, L0). At one clock after S0, the input switching signal enters the state of "1", so that data read from the memory 15 at the serial-parallel conversion circuit 16, that is, data of the previous block, is output to the one-dimensional inverse discrete cosine transformation circuit 13 (FIG. 4, M0).

Hereafter, input data which is an output of the serial-parallel conversion circuit 11 and data of a previous block subjected to one-dimensional inverse discrete cosine transformation which is an output of the serial-parallel conversion circuit 16 is alternately applied to the one-dimensional inverse discrete cosine transformation circuit 13 at every one clock. Here, since the one-dimensional inverse discrete cosine transformation circuit 13 is capable of processing two data at each clock, data application from the serial-parallel conversion circuits 11 and 16 is alternately conducted four times each. In addition, when data application is conducted four times from the serial-parallel conversion circuit 11 and four times from the serial-parallel conversion circuit 16, eight clocks will pass, during which time subsequent eight data accumulated at each of the serial-parallel conversion circuits 11 and 16 is successively applied to the one-dimensional inverse discrete cosine transformation circuit 13. As a result, the one-dimensional inverse discrete cosine transformation circuit 13 is allowed to continuously receive input of data at any time without entering an input waiting state.

After five clocks have passed (FIG. 4, 200), which is equivalent to the internal processing time of the one-dimensional inverse discrete cosine transformation circuit 13, since S0 when data application to the one-dimensional inverse discrete cosine transformation circuit 13 starts, data obtained by subjecting input data to one-dimensional inverse discrete cosine transformation is output from the one-dimensional inverse discrete cosine transformation circuit 13 at one clock (FIG. 4, L'0). At this time, since the input switching signal of the input switching control circuit 17 is at the state of "1", the data allocation circuit 18 sends the output data to the memory 15. Then, the data is written at a fixed address in the memory 15. As described in the foregoing, since the memory address switching signal in this cycle is at the state of "0", data is written in a row direction of addresses of the memory 15. The data, however, is not overwritten but written at an address from which data of the previous block has been already read, as described in the foregoing.

After one clock has passed since the data output from the one-dimensional inverse discrete cosine transformation circuit 13 started, data of the previous block whose one-dimensional inverse discrete cosine transformation has been conducted and which is then subjected to the second one-dimensional inverse discrete cosine transformation is output (FIG. 4, M'0). At this time, since the input switching signal of the input switching control circuit 17 is at the state of "0", the data allocation circuit 18 sends the output data to the output pin. Then, the data is output externally to the two-dimensional inverse discrete cosine transformation circuit.

The one-dimensional inverse discrete cosine transformation circuit 13 thus alternately outputs, at every one clock, two each of data obtained by subjecting input data to the first one-dimensional inverse discrete cosine transformation and two each of data obtained by subjecting data of a previous block which has been read from the memory 15 and then subjected to one-dimensional inverse discrete cosine transformation to the second one-dimensional inverse discrete cosine transformation.

Then, the data allocation circuit 18 alternately switches and outputs the output data to the memory 15 and the output pin at every one clock.

At S1, one-dimensional inverse discrete cosine transformation is completed with respect to all of the 64 data applied through the input pin and the 64 data of the previous block subjected to one-dimensional inverse discrete cosine transformation. At this time point, the data applied through the input pin will have been written at the memory 15 as data of one block whose one-dimensional inverse discrete cosine transformation has been finished, and the data of the previous block whose one-dimensional inverse discrete cosine transformation has been finished will have been externally output.

When subsequent data applied from the input pin starts, the data in question stored in the memory 15 is read out to the serial-parallel conversion circuit 16 as data of a previous block whose one-dimensional inverse discrete cosine transformation has been finished.

In this cycle, the memory address switching signal changes from the state of "0" to the state of "1", so that data reading from the memory 15 is conducted in a column direction. As a result, the read block data is subjected to the second one-dimensional inverse discrete cosine transformation in a column direction.

Through the repetition of the foregoing processing, two each of block data input from the input pin is applied to the one-dimensional inverse discrete cosine transformation circuit 13 at every other clock and after being subjected to the one-dimensional inverse discrete cosine transformation twice, is output from the output pin. During this period, when the first one-dimensional inverse discrete cosine transformation is being conducted, data of a previous block will be processed at every other clock while the present block data is input, and when the second one-dimensional inverse discrete cosine transformation is being conducted, data of a subsequent block will be processed every other clock while the present block data is input. This prevents the one-dimensional inverse discrete cosine transformation circuit 13 from entering a data input waiting state to enable data application and processing at any time.

Figure 5:
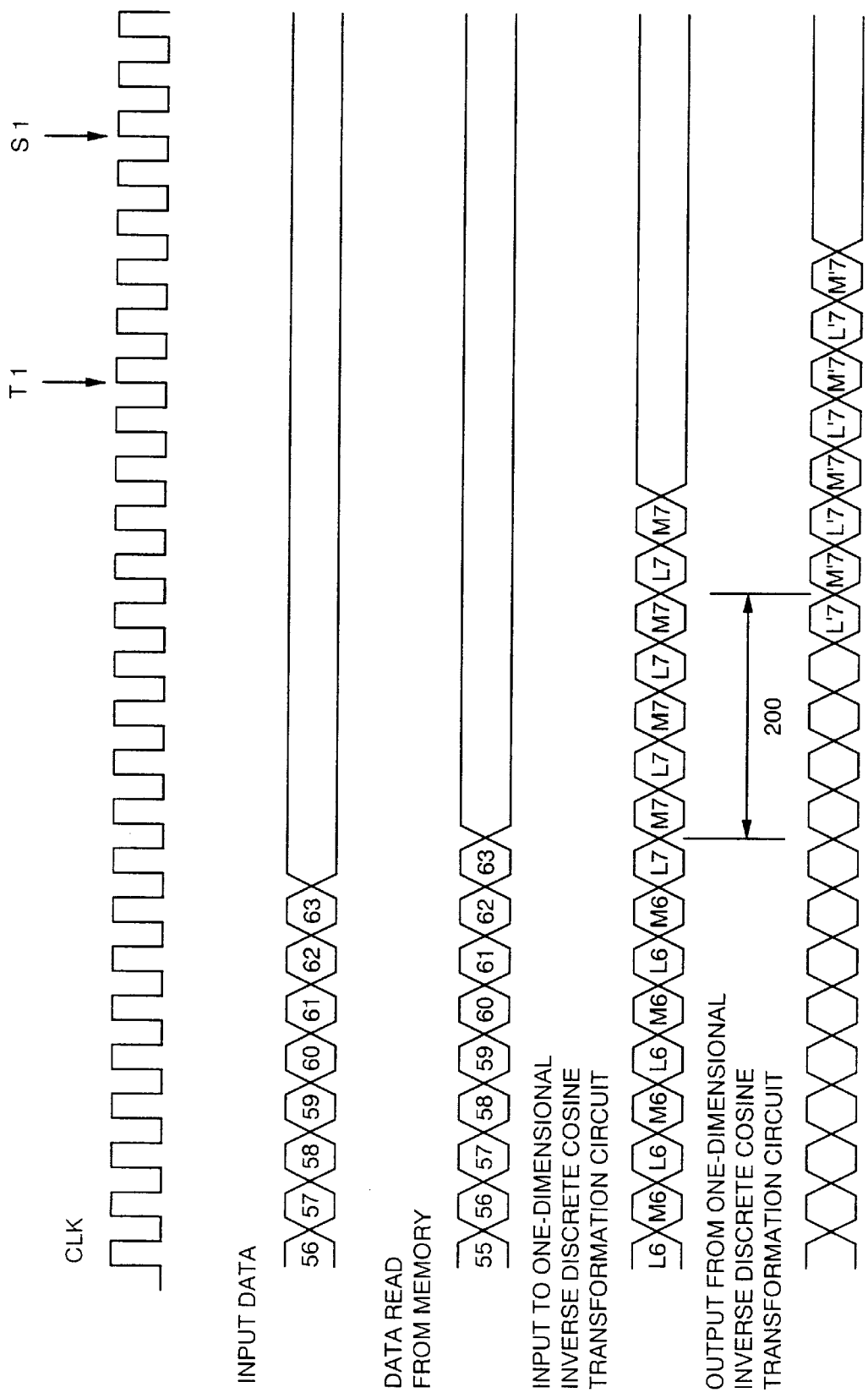
FIG. 5 is a timing chart showing operation of the present embodiment.
Figure 7:
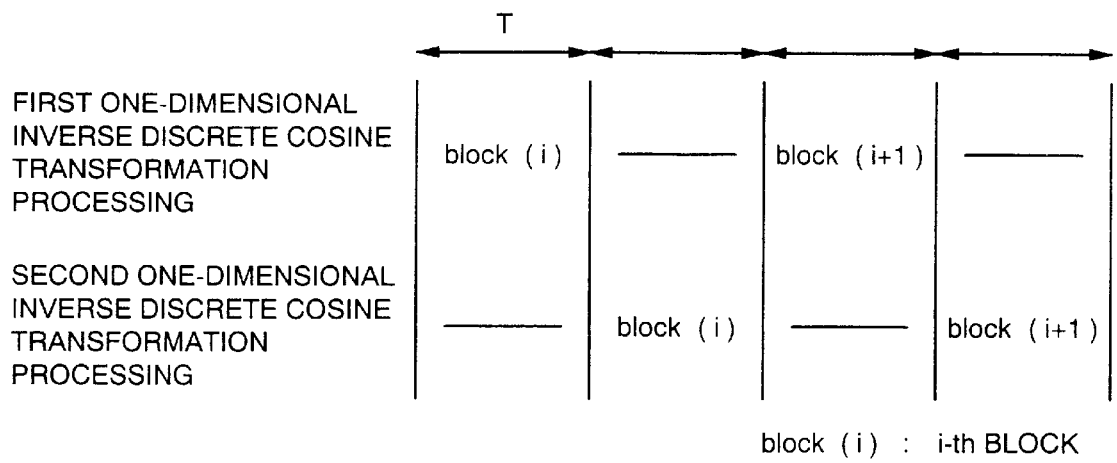
FIG. 7 is a timing chart showing time for processing block data by a conventional two-dimensional inverse discrete cosine transformation circuit.
Figure 8:
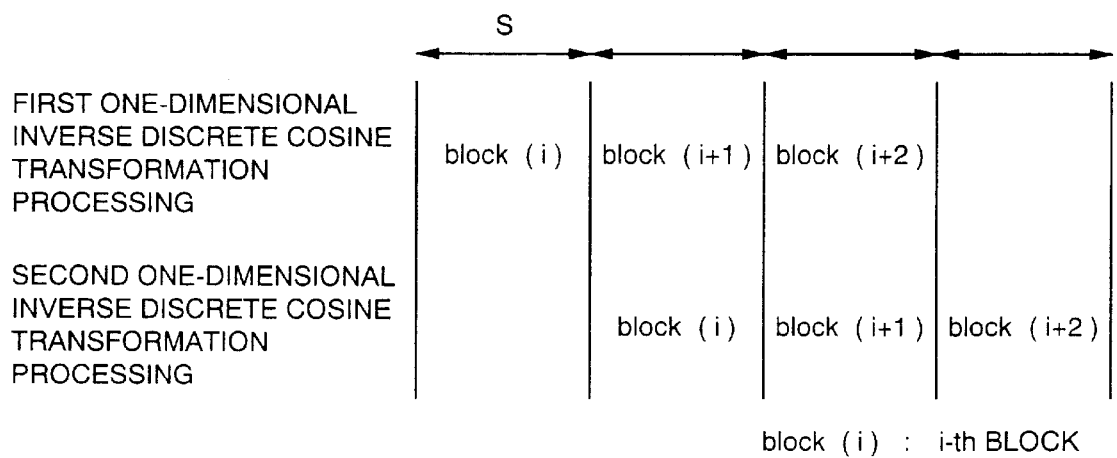
FIG. 8 is a timing chart showing time for processing block data by the two-dimensional inverse discrete cosine transformation circuit of the present embodiment.
Figure 9:
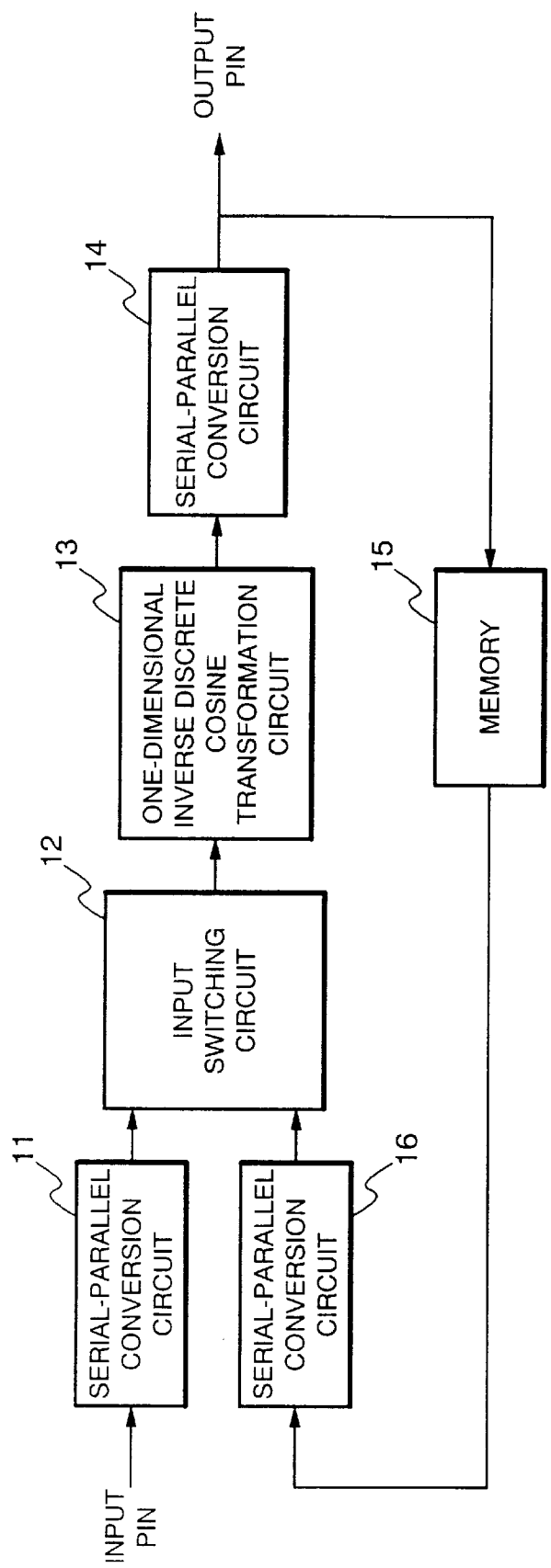
FIG. 9 is a block diagram showing structure of the conventional two-dimensional inverse discrete cosine transformation circuit.
Figure 10:
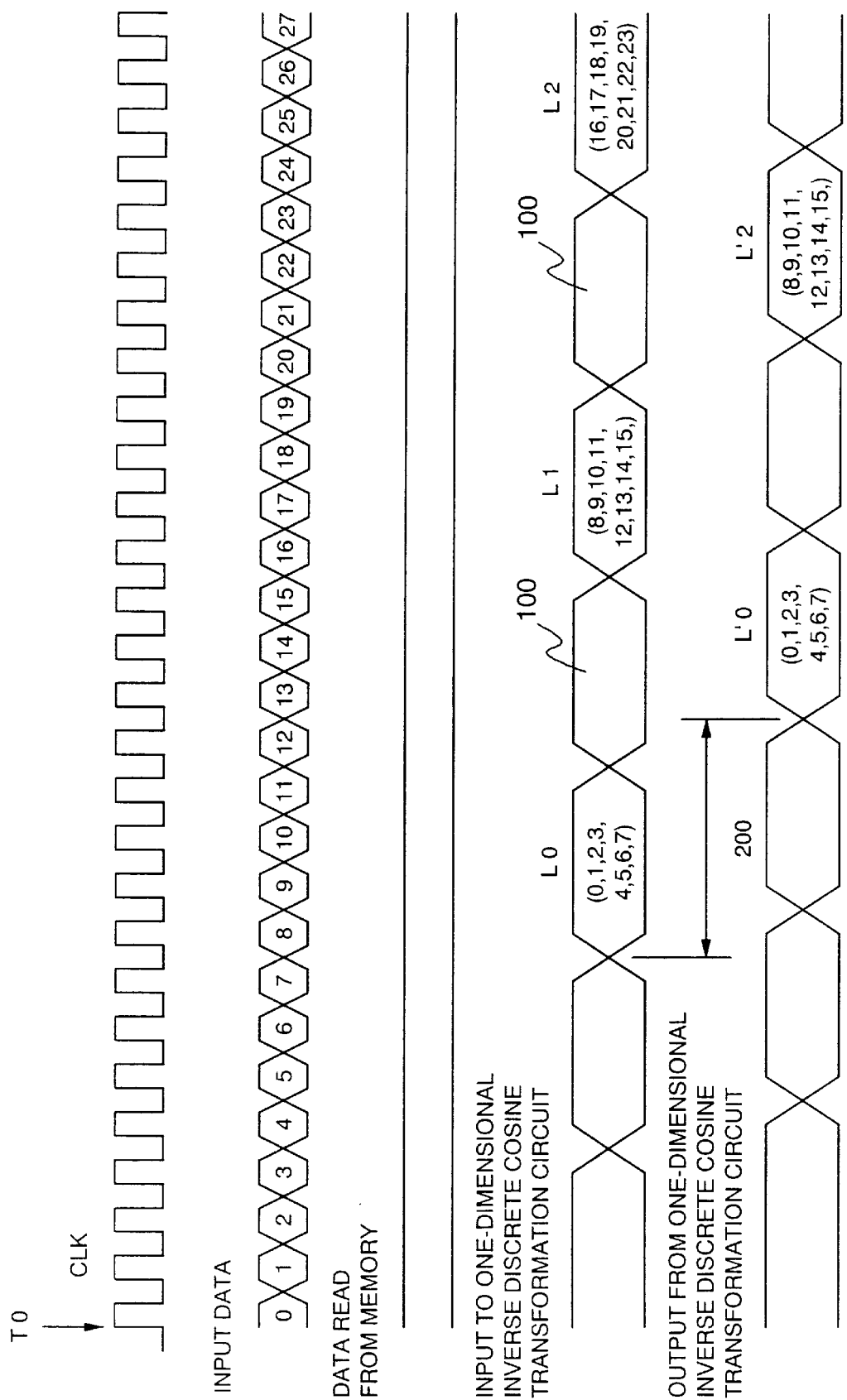
FIG. 10 is a timing chart showing operation of the conventional two-dimensional inverse discrete cosine transformation circuit.
Figure 11:
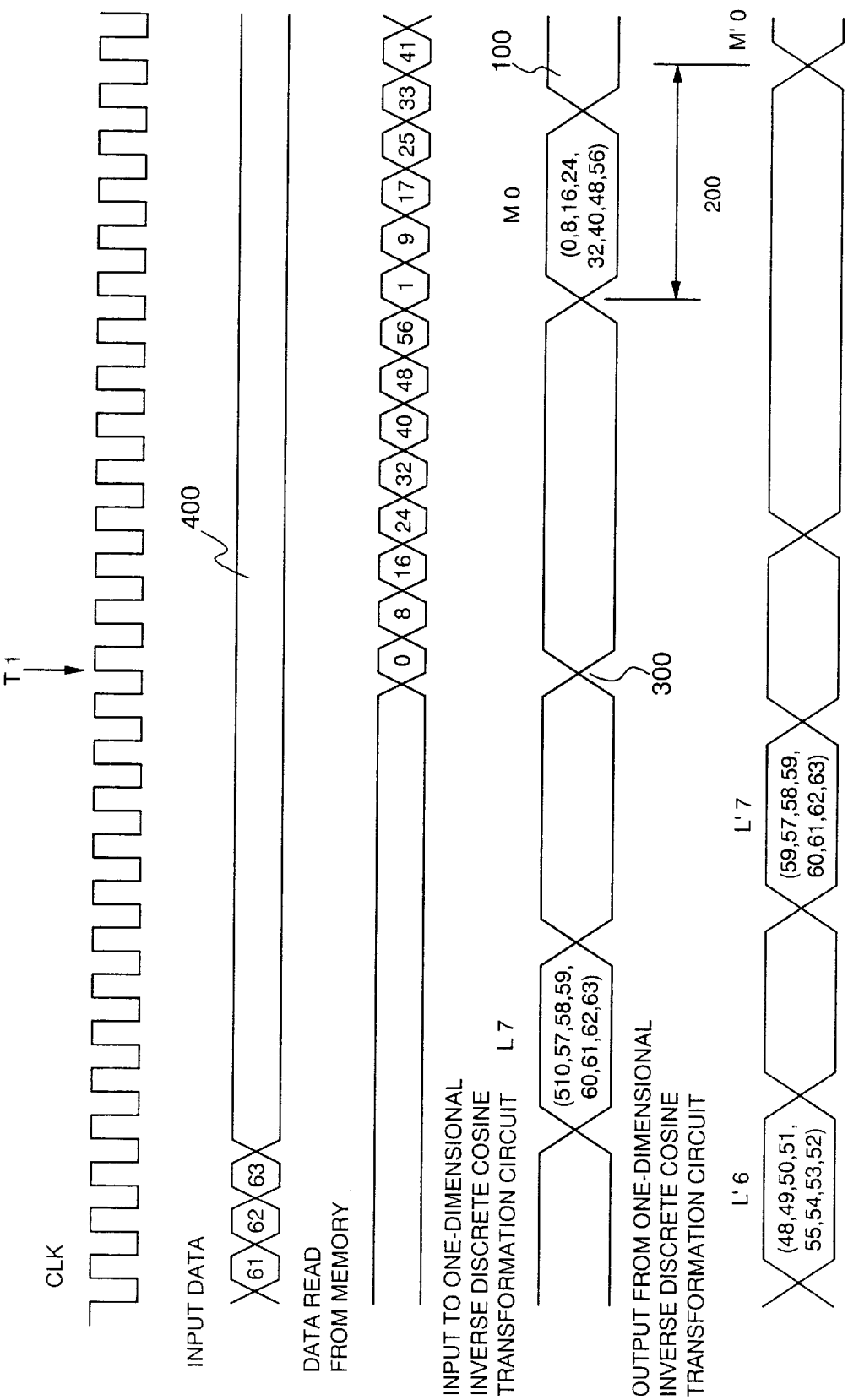
FIG. 11 is a timing chart showing operation of the conventional two-dimensional inverse discrete cosine transformation circuit.

With a time from T0 of FIG. 4 to S1 of FIG. 5 denoted as S, a time required for conducting two-dimensional inverse discrete cosine transformation with respect to block data of k blocks will be represented as (k+1)S as shown in FIG. 8. As described in the foregoing, with a time required for processing block data of one block in a conventional two-dimensional inverse discrete cosine transformation circuit denoted as 2T, a time required for processing block data of k blocks will be represented as 2kT as shown in FIG. 7. With reference to FIGS. 4 and 5, there is little difference between the time S and the time T. When the value of k is large To enough, therefore, a time required for processing block data of k blocks will be substantially half the time required by the conventional circuit.

Although the present invention has been described with respect to the preferred embodiment in the foregoing, the present invention is not limited to the above-described embodiment. In the above embodiment, it is assumed, for example, that the internal processing time of the one-dimensional inverse discrete cosine transformation circuit is five clocks and that in a case where the data allocation circuit switches an output destination of output data of the one-dimensional inverse discrete cosine transformation circuit, the output data is sent to the memory when the input switching signal of the input switching control circuit is at the state of "1" and to the output pin when the signal is at the state of "0". The internal processing time of the one-dimensional inverse discrete cosine transformation circuit, however, may have other value than five clocks. In this case, when the internal processing time of the one-dimensional inverse discrete cosine transformation circuit corresponds to even clocks, the output destination is switched by the data allocation circuit to the output pin when the input switching signal is at the state of "1" and is switched to the memory when the signal is at the state of "0". When the internal processing time of the one-dimensional inverse discrete cosine transformation circuit corresponds to odd clocks, the output data is sent to the memory when the input switching signal is at the state of "1" and sent to the output pin when the signal is at the state of "0".

In addition, while in the present invention, new block data applied from the input pin and previous block data subjected to one-dimensional inverse discrete cosine transformation processing once is applied to the one-dimensional inverse discrete cosine transformation circuit alternately at every one clock, the data to be applied may be switched not at every one clock but at every two clocks or four clocks. In this case, switching timing of the input switching circuit and the data allocation circuit should be appropriately modified according to the setting of the one-dimensional inverse discrete cosine transformation circuit.

Furthermore, the present invention is also applicable to two-dimensional discrete cosine transformation which is equivalent to inverse transformation of two-dimensional inverse discrete cosine transformation. More specifically, two-dimensional discrete cosine transformation can be implemented by replacing the one-dimensional inverse discrete cosine transformation circuit in the structure of the present invention with a one-dimensional discrete cosine transformation circuit and operating and controlling the latter circuit in the same manner as in the present invention.

As described in the foregoing, the two-dimensional inverse discrete cosine transformation circuit of an MPEG2 video decoder according to the present invention is allowed to receive input of data efficiently without a waiting time when data is applied to the one-dimensional inverse discrete cosine transformation circuit, whereby reduction of a processing time can be achieved which is required for conducting two-dimensional inverse discrete cosine transformation processing with respect to a plurality of block data. With the number of block data to be processed large enough, the processing time can be substantially reduced by half.

In addition, the present invention realizes the above-described effects with ease because it obtains the above-described effects by its unique circuit control without changing circuit scale.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A two-dimensional inverse discrete cosine transformation circuit of an MPEG2 video decoder which conducts two-dimensional inverse discrete cosine transformation by subjecting block data composed of a plurality of data to one-dimensional inverse discrete cosine transformation twice, comprising:
   a first serial-parallel converter for parallel-converting externally applied new input data and outputting the converted data;
   a storage for storing data of a previous block already subjected to first one-dimensional inverse discrete cosine transformation;

a second serial-parallel converter for obtaining said data of said previous block from said storage, parallel-converting said data and outputting said converted data;

an input switch for receiving input of data output from said first serial-parallel converter and data output from said second serial-parallel converter and selectively switching and outputting one of said data from said first and said data from said second serial-parallel converters;

an input switching control for controlling operation of said input switch;

an one-dimensional inverse discrete cosine transformer for conducting one-dimensional inverse discrete cosine transformation with respect to data applied through said input switch;

a third serial-parallel converter for serial-converting and outputting output data of said one-dimensional inverse discrete cosine transformer; and a data allocator for controlling an output destination of output data of said third serial-parallel converter by switching under the control of said input switch and said input switching control to send data subjected to first one-dimensional inverse discrete cosine transformation to said storage and externally output data subjected to second one-dimensional inverse discrete cosine transformation;

said input switching control controlling said input switch to alternately and continuously output the data output from said first serial-parallel converter and the data output from said second serial-parallel converter at predetermined times of operation clocks, and said data allocator switching an output destination of the output data of said third serial parallel converter at timing delayed by an internal processing time of said one-dimensional inverse discrete cosine transformer from the timing of switching of said input switch by said input switching control.

2. The two-dimensional inverse discrete cosine transformation circuit as set forth in claim 1, wherein said input switching control transmits an input switching signal instructing on the switching of said input switch at predetermined times of operation clocks, said input switch switches output data on condition of reception of said input switching signal, and said data allocator switches an output destination of the output data of said third serial-parallel converter according to a setting, taking a delay by an internal processing time of said one-dimensional inverse discrete cosine transformer into consideration, on condition of the reception of said input switching signal.

3. The two-dimensional inverse discrete cosine transformation circuit as set forth in claim 1, wherein said input switching control transmits an input switching signal instructing on the switching of said input switch at every one operation clock, said input switch switches output data at said every one operation clock on condition of reception of said input switching signal, and said data allocator switches an output destination of the output data of said third serial-parallel converter at said every one operation clock according to a setting, taking a delay by an internal processing time of said one-dimensional inverse discrete cosine transformer into consideration, on condition of the reception of said input switching signal.

4. The two-dimensional inverse discrete cosine transformation circuit as set forth in claim 1, wherein said storage includes an address space forming a square matrix, when data of one block applied from said data allocator is stored along a row of said address space in order, reads the data along a column of said address space and sequentially stores data of a subsequent block applied next from said data allocator along said column of the address space from which said data has been read, and when said data of said one block applied from said data allocator is stored along said column of said address space in order, reads the data along said row of said address space and sequentially stores said data of said subsequent block applied next from said data allocator along said row of the address space from which said data has been read.

5. The two-dimensional inverse discrete cosine transformation circuit as set forth in claim 1, wherein said input switching control transmits an input switching signal instructing on the switching of said input switch at predetermined times of operation clocks, said input switch switches output data on condition of reception of said input switching signal, said data allocator switches an output destination of the output data of said third serial-parallel converter according to a setting, taking a delay by an internal processing time of said one-dimensional inverse discrete cosine transformer into consideration, on condition of the reception of said input switching signal, and said storage includes an address space forming a square matrix, when data of one block applied from said data allocator is stored along a row of said address space in order, reads the data along a column of said address space and sequentially stores data of a subsequent block applied next from said data allocator along said column of the address space from which said data has been read, and when said data of said one block applied from said data allocator is stored along said column of said address space in order, reads the data along said row of said address space and sequentially stores said data of said subsequent block applied next from said data allocator along said row of the address space from which said data has been read.

6. The two-dimensional inverse discrete cosine transformation circuit as set forth in claim 1, wherein said input switching control transmits an input switching signal instructing on the switching of said input switch at every one operation clock, said input switch switches output data at said every one operation clock on condition of reception of said input switching signal, said data allocator switches an output destination of the output data of said third serial parallel converter at said every one operation clock according to a setting, taking a delay by an internal processing time of said one-dimensional inverse discrete cosine transformer into consideration, on condition of the reception of said input switching signal, and said storage includes an address space forming a square matrix, when data of one block applied from said data allocator is stored along a row of said address space in order, reads the data along a column of said address space and sequentially stores data of a subsequent block applied next from said data allocator along said column of the address space from which said data has been read, and when said data of said one block applied from said data allocator is stored along said column of said address space in order, reads the data along said row of said address space and sequentially stores said data of said subsequent block applied next from said data allocator along said row of the address space from which said data has been read.

7. The two-dimensional inverse discrete cosine transformation circuit as set forth in claim 1, wherein said storage includes an address space forming a square matrix of eight rows by eight columns, when data of one block applied from said data allocator is stored along a row of said address space in order, reads the data along a column of said address space and sequentially stores data of a subsequent block applied next from said data allocator along said column of the address space from which said data has been read, and when said data of said one block applied from said data allocator is stored along said column of said address space in order, reads the data along said row of said address space and sequentially stores said data of said subsequent block applied next from said data allocator along said row of the address space from which said data has been read.

8. The two-dimensional inverse discrete cosine transformation circuit as set forth in claim 1, wherein said input switching control transmits an input switching signal instructing on the switching of said input switch at predetermined times of operation clocks, said input switch switches output data on condition of reception of said input switching signal, said data allocator switches an output destination of the output data of said third serial parallel converter according to a setting taking a delay by an internal processing time of said one-dimensional inverse discrete cosine transformer into consideration, on condition of the reception of said input switching signal, and said storage includes an address space forming a square matrix of eight rows by eight columns, when data of one block applied from said data allocator is stored along a row of said address space in order, reads the data along a column of said address space and sequentially stores data of a subsequent block applied next from said data allocator along said column of the address space from which said data has been read, and when said data of said one block applied from said data allocator is stored along said column of said address space in order, reads the data along said row of said address space and sequentially stores said data of said subsequent block applied next from said data allocator along said row of the address space from which said data has been read.

9. The two-dimensional inverse discrete cosine transformation circuit as set forth in claim 1, wherein said input switching control transmits an input switching signal instructing on the switching of said input switch at every one operation clock, said input switch switches output data at said every one operation clock on condition of reception of said input switching signal, said data allocator switches an output destination of the output data of said third serial-parallel converter at said every one operation clock according to a setting taking a delay by an internal processing time of said one-dimensional inverse discrete cosine transformer into consideration, on condition of the reception of said input switching signal, and said storage includes an address space forming a square matrix of eight rows by eight columns, when data of one block applied from said data allocator is stored along a row of said address space in order, reads the data along a column of said address space and sequentially stores data of a subsequent block applied next from said data allocator along said column of the address space from which said data has been read, and when said data of said one block applied from said data allocator is stored along said column of said address space in order, reads the data along said row of said address space and sequentially stores said data of said subsequent block applied next from said data allocator along said row of the address space from which said data has been read.

10. A two-dimensional inverse discrete cosine transformation circuit which conducts two-dimensional inverse discrete cosine transformation by subjecting block data composed of a plurality of data to one-dimensional inverse discrete cosine transformation twice, comprising:

a storage for storing data of a previous block already subjected to first one-dimensional inverse discrete cosine transformation;

an input switch for receiving externally applied new input data and data of said previous block output from said storage and selectively switching and outputting one of said applied new input data and said data of said previous block;

an input switching control for controlling operation of said input switch;

an one-dimensional inverse discrete cosine transformer for conducting one-dimensional inverse discrete cosine transformation with respect to data applied through said input switch;

a data allocator for controlling an output destination of output data of said one-dimensional inverse discrete cosine transformer by switching under the control of said input switch and said input switching control to send data subjected to first one-dimensional inverse discrete cosine transformation to said storage and externally output data subjected to second one-dimensional inverse discrete cosine transformation;

said input switching control controlling said input switch to alternately and continuously output the externally applied new input data and the data of said previous block output from said storage at predetermined times of operation clocks, and said data allocator switching an output destination of the output data of said one-dimensional inverse discrete cosine transformer at timing delayed by an internal processing time of said one-dimensional inverse discrete cosine transformer from the timing of switching of said input switch by said input switching control.

11. The two-dimensional inverse discrete cosine transformation circuit as set forth in claim 10, wherein said input switching control transmits an input switching signal instructing on the switching of said input switch at predetermined times of operation clocks, said input switch switches output data on condition of reception of said input switching signal, and said data allocator switches an output destination of the output data of said one-dimensional inverse discrete cosine transformer according to a setting, taking a delay by an internal processing time of said one-dimensional inverse discrete cosine transformer into consideration, on condition of the reception of said input switching signal.

12. The two-dimensional inverse discrete cosine transformation circuit as set forth in claim 10, wherein said input switching control transmits an input switching signal instructing on the switching of said input switch at every one operation clock, said input switch switches output data at said every one operation clock on condition of reception of said input switching signal, and said data allocator switches an output destination of the output data of said one-dimensional inverse discrete cosine transformer at said every one operation clock according to a setting, taking a delay by an internal processing time of said one-dimensional inverse discrete cosine transformer into consideration, on condition of the reception of said input switching signal.

13. The two-dimensional inverse discrete cosine transformation circuit as set forth in claim 10, wherein said storage includes an address space forming a square matrix, when data of one block applied from said data allocator is stored along a row of said address space in order, reads the data along a column of said address space and sequentially stores data of a subsequent block applied next from said data allocator along said column of the address space from which said data has been read, and when said data of said one block applied from said data allocator is stored along said column of said address space in order, reads the data along said row of said address space and sequentially stores said data of said subsequent block applied next from said data allocator along said row of the address space from which said data has been read.

14. The two-dimensional inverse discrete cosine transformation circuit as set forth in claim 10, wherein said input switching control transmits an input switching signal instructing on the switching of said input switch at predetermined times of operation clocks, said input switch switches output data on condition of reception of said input switching signal, said data allocator switches an output destination of the output data of said one-dimensional inverse discrete cosine transformer according to a setting, taking a delay by an internal processing time of said one-dimensional inverse discrete cosine transformer into consideration, on condition of the reception of said input switching signal, and said storage includes an address space forming a square matrix, when data of one block applied from said data allocator is stored along a row of said address space in order, reads the data along a column of said address space and sequentially stores data of a subsequent block applied next from said data allocator along said column of the address space from which said data has been read, and when said data of said one block applied from said data allocator is stored along said column of said address space in order, reads the data along said row of said address space and sequentially stores said data of said subsequent block applied next from said data allocator along said row of the address space from which said data has been read.

15. The two-dimensional inverse discrete cosine transformation circuit as set forth in claim 10, wherein said input switching control transmits an input switching signal instructing on the switching of said input switch at every one operation clock, said input switch switches output data at said every one operation clock on condition of reception of said input switching signal, said data allocator switches an output destination of the output data of said one-dimensional inverse discrete cosine transformer at said every one operation clock according to a setting, taking a delay by an internal processing time of said one-dimensional inverse discrete cosine transformer into consideration, on condition of the reception of said input switching signal, and said storage includes an address space forming a square matrix, when data of one block applied from said data allocator is stored along a row of said address space in order, reads the data along a column of said address space and sequentially stores data of a subsequent block applied next from said data allocator along said column of the address space from which said data has been read, and when said data of said one block applied from said data allocator is stored along said column of said address space in order, reads the data along said row of said address space and sequentially stores said data of said subsequent block applied next from said data allocator along said row of the address space from which said data has been read.

16. The two-dimensional inverse discrete cosine transformation circuit as set forth in claim 10, wherein said storage includes an address space forming a square matrix of eight rows by eight columns, when data of one block applied from said data allocator is stored along a row of said address space in order, reads the data along a column of said address space and sequentially stores data of a subsequent block applied next from said data allocator along said column of the address space from which said data has been read, and when said data of said one block applied from said data allocator is stored along said column of said address space in order, reads the data along said row of said address space and sequentially stores said data of said subsequent block applied next from said data allocator along said row of the address space from which said data has been read.

17. The two-dimensional inverse discrete cosine transformation circuit as set forth in claim 10, wherein said input switching control transmits an input switching signal instructing on the switching of said input switch at predetermined times of operation clocks, said input switch switches output data on condition of reception of said input switching signal, said data allocator switches an output destination of the output data of said one-dimensional inverse discrete cosine transformer according to a setting, taking a delay by an internal processing time of said one-dimensional inverse discrete cosine transformer into consideration, on condition of the reception of said input switching signal, and said storage includes an address space forming a square matrix of eight rows by eight columns, when data of one block applied from said data allocator is stored along a row of said address space in order, reads the data along a column of said address space and sequentially stores data of a subsequent block applied next from said data allocator along said column of the address space from which said data has been read, and when said data of said one block applied from said data allocator is stored along said column of said address space in order, reads the data along said row of said address space and sequentially stores said data of said subsequent block applied next from said data allocator along said row of the address space from which said data has been read.

18. The two-dimensional inverse discrete cosine transformation circuit as set forth in claim 10, wherein said input switching control transmits an input switching signal instructing on the switching of said input switch at every one operation clock, said input switch switches output data at said every one operation clock on condition of reception of said input switching signal, said data allocator switches an output destination of the output data of said third serial-parallel converter at said every one operation clock according to a setting, taking a delay by an internal processing time of said one-dimensional inverse discrete cosine transformer into considerations on condition of the reception of said input switching signal, and said storage includes an address space forming a square matrix of eight rows by eight columns, when data of one block applied from said data allocator is stored along a row of said address space in order, reads the data along a column of said address space and sequentially stores data of a subsequent block applied next from said data allocator along said column of the address space from which said data has been read, and when said data of said one block applied from said data allocator is stored along said column of said address space in order, reads the data along said row of said address space and sequentially stores said data of said subsequent block applied next from said data allocator along said row of the address space from which said data has been read.

* * * * *